Aug. 20, 1929.
H. BANY ET AL
1,725,697
REGULATING SYSTEM
Filed Dec. 24, 1928
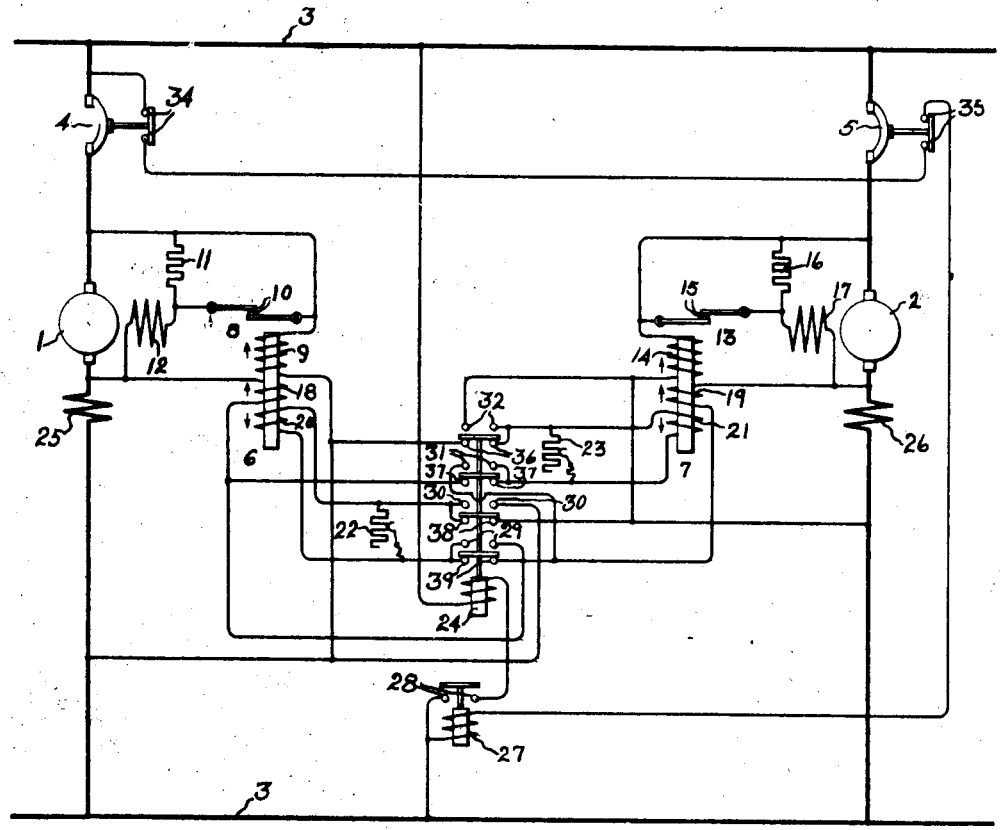
Inventors:
Harold T. Seeley,
Herman Bany,
by Charles E. Tullar
Their Attorney.

Patented Aug. 20, 1929.

1,725,697

UNITED STATES PATENT OFFICE.

HERMAN BANY AND HAROLD T. SEELEY, OF YEADON, PENNSYLVANIA, ASSIGNORS TO GENERAL ELECTRIC COMPANY, A CORPORATION OF NEW YORK.

REGULATING SYSTEM.

Application filed December 24, 1928. Serial No. 328,136.

Our invention relates to regulating systems and particularly to a system for regulating the voltage and the division of load between a plurality of sources of current which are connected in parallel.

One object of our invention is to provide an improved regulating system for a plurality of sources of current whereby the voltage of any one of the sources when operating alone is varied in a predetermined manner as the output of the source varies and whereby the voltage of a plurality of the sources, when connected in parallel, is varied in a similar manner as the output currents of the sources vary and whereby a predetermined load division is maintained between the parallel connected sources.

Our invention will be better understood from the following description, when taken in connection with the accompanying drawing which is a diagrammatic showing of a regulating arrangement for two direct current generators embodying our invention, and the scope of our invention will be pointed out in the appended claims.

In the accompanying drawing, 1 and 2 represent two sources of current shown as direct current generators which are arranged to be connected in parallel to a common load circuit 3 by means of suitable switching devices 4 and 5 respectively which may be of any suitable type examples of which are well known in the art. As shown in the drawing, the circuit breakers are manually controlled but it is to be understood that any suitable automatic means, examples of which are well known in the art, may be provided for effecting the closing of these circuit breakers at the proper time.

The generators 1 and 2 are provided with suitable voltage regulating means 6 and 7 respectively which may be of any suitable construction examples of which are well known in the art. In order to simplify the disclosure, however, the regulating means for each generator is merely shown as a relay which is arranged to short-circuit a resistor in the shunt field circuit of the associated generator. In actual practice, however, anti-hunting coils and various other control devices and auxiliaries, all of which are well known in the art, may be used.

As shown in the drawing, the regulating means 6 comprises a regulating relay 8 which has a voltage winding 9 connected so as to be energized in response to the voltage of the generator 1. The relay 8 is arranged to open the contacts 10 in a shunt circuit around the resistor 11 in the circuit of the shunt field winding 12 of the generator 1 when the voltage of the generator 1 exceeds a predetermined value.

The regulating means 7 comprises a similar regulating relay 13 which has a voltage winding 14 connected so as to be energized in response to the voltage of the generator 2. The relay 13 is arranged to open contacts 15 in a shunt circuit around the resistor 16 in the circuit of the shunt field winding 17 of the generator 2 when the voltage of the generator 2 exceeds a predetermined value.

In order that each regulator may vary the voltage of the associated generator as the current output thereof varies, the regulating relays 8 and 13 are respectively provided with the undercompounding current windings 18 and 19 respectively and the overcompounding current windings 20 and 21 respectively. The windings 9 and 18 and the windings 14 and 19 are cumulatively arranged respectively whereas the windings 20 and 21 are differentially arranged with respect to the other windings of the respective relays.

When each generator is operating alone the two current windings of the associated regulating relay are connected so that they are energized in accordance with the current through the associated source. If a rising voltage characteristic is desired, the current windings are so arranged that for any given value of generator current the ampere turns of the associated overcompounding current winding are greater than the ampere turns of the respective undercompounding current winding whereas if a drooping voltage characteristic is desired, the current windings are arranged so that for a given value of generator current the ampere turns of the undercompounding winding are greater than the ampere turns of the respective overcompounding current winding. Any desired value of compounding may be obtained by varying in any suitable manner the relative currents in the current windings on the relays, as shown in the drawing adjustable resistors 22 and 23, in shunt to the winding 20 and 21 respectively are provided for this purpose.

In order that the voltage characteristics of the two generators 1 and 2 when they are operating in parallel may be the same as when they are operating alone, and a predetermined load division may be maintained between the generators, the overcompounding current coils 20 and 21 are arranged so that they can be connected in such a manner that they are energized in response to the output currents of the generators 2 and 1 respectively when the two generators are operating in parallel. In the particular embodiment of our invention shown in the drawing, the connections of the current coils 20 and 21 are controlled by means of a relay 24 which when energized connects the windings 18 and 20 of the relay 8 in series in a shunt circuit around the series commutating field winding 25 of the generator 1 and connects the windings 19 and 21 of the relay 13 in series in a shunt circuit around the series commutating field winding 26 of the generator 2. The relay 24 is arranged to be energized when the associated control relay 27 is deenergized. The control relay 27 in turn is arranged in any suitable manner so that it is energized when both of the generators 1 and 2 are supplying current to the load circuit. This result is obtained in the arrangement shown in the drawing by having the circuit of the relay 27 include auxiliary contacts on the circuit breakers 4 and 5 so that the control relay 27 can be energized only when both of the circuit breakers 4 and 5 are closed.

The operation of the arrangement shown in the drawing is as follows: When only one of the generators is connected to the load circuit 3, the control relay 27 is deenergized and, therefore, the circuit of the relay 24 is completed across the load circuit 3 through the contacts 28 of the relay 27. The relay 24 when energized connects the windings 18 and 20 of the relay 8 and the contacts 29 and 30 of the relay 24 in series in a shunt circuit around the field winding 25 of the generator 1 and also connects the windings 14 and 19 of the relay 13 and the contacts 31 and 32 of the relay 24 in series in a shunt circuit around the series field windings 26 of the generator 2.

If we assume that the circuit breaker 4 is closed, the generator 1 is supplying current to the load circuit 3 and the current windings 18 and 20 are arranged so that the ampere turns of the winding 20 exceed the ampere turns of the winding 18, it is obvious to one skilled in the art that as the current through the generator 1 increases, the resultant ampere turns of the windings 18 and 20 increase and tend to decrease the total flux in the relay so that a greater voltage across the terminals of the generator 1 is required to cause the relay 8 to open its contacts 10. Therefore, the regulator causes the generator voltage to increase as the output of the generator 1 increases. In a similar manner the regulator 13 causes the voltage of the generator 2 to increase as the output thereof increases when the generator 2 is operating alone.

When both generators are connected in parallel so that the control relay 27 is energized through the auxiliary contacts 34 on the circuit breaker 4 and the auxiliary contacts 35 on the circuit breaker 5, the circuit of the relay 24 is opened at the contacts 28 of the control relay 27 and, therefore, the relay 24 is deenergized. When the relay 24 is deenergized, the undercompounding winding 18 of the relay 8 and the overcompounding winding 21 of the relay 13 and the contacts 36 and 37 of the relay 24 are connected in series in shunt around the series field winding 25 of the generator 1 and the undercompounding winding 19 of the relay 13 and the overcompounding winding 20 of the relay 8 and the contacts 38 and 39 of the relay 24 are connected in series in a shunt around the series field winding 26 of the generator 2.

As long as the currents through the generators 1 and 2 are equal, the operation of the regulators 6 and 7 is the same as when the respective generators are operating alone. When, however, one of the generators tends to supply more than its share of the load, the regulators 6 and 7 operate to restore the desired relation between the outputs of the two generators. For example, if the current through the generator 1 is greater than the current through the generator 2 the current through the windings 18 and 21 is greater than the current through the windings 19 and 20. The resultant ampere turns of the windings 18 and 20, therefore, cause the regulator 8 to decrease the voltage and the current of the generator 1 and the resultant ampere turns of the windings 19 and 21 cause the regulator 13 to increase the voltage and the current of the generator 2 so that the proper division of current between the two generators is restored.

In a similar manner the regulator 6 increases the voltage and current of the generator 1 and the regulator 7 decreases the voltage and current of the generator 2 when the current through the generator 2 exceeds the current through the generator 1.

The advantage in using two differentially arranged current windings on each regulating relay respectively energized in response to the current thourgh the two generators, instead of the usual practice of using a single current winding energized in response to the current through the other sources is that our improved arrangement produces a greater voltage difference between the two generators when a current unbalance occurs. This voltage difference or stabilizing voltage as it is sometimes called is the voltage which tends to correct the unbalanced current. Experience has shown that when a single current winding is used on each regulating relay the desired stabilizing voltage cannot be obtained in many cases without too much compounding. With our improved arrangement the desired stabilizing voltage can be obtained with any desired amount of compounding.

While we have, in accordance with the patent statutes, shown and described our invention as applied to a particular system and as embodying various devices diagrammatically indicated, changes and modifications will be obvious to those skilled in the art and we, therefore, aim in the appended claims to cover all such changes and modifications as fall within the true spirit and scope of our invention.

What we claim as new and desire to secure by Letters Patent of the United States, is:

1. In combination, a plurality of sources of current, means for connecting said sources in parallel, regulating means associated with each source for controlling the output thereof comprising a device having three cooperating windings, two of which are cumulatively arranged and respectively energized in accordance with the voltage and the current output of the associated source and the third winding of which is differentially arranged with respect to the other two windings, and switching means for selectively controlling the connections of said third windings so that they are energized in response to currents through different sources under different conditions of operation.

2. In combination, a plurality of sources of current, means for connecting said sources in parallel, regulating means associated with each source for controlling the output thereof comprising a device having three cooperating windings, two of which are cumulatively arranged and respectively energized in accordance with the voltage and current output of the associated source and the third winding of which is differentially arranged with respect to the other two windings, and switching means for connecting said third windings so that each is energized in accordance with the current through the associated source and for connecting said third windings so that each is energized in accordance with the current through a source other than its associated source.

3. In combination, a plurality of dynamo electric machines, means for connecting said machines in parallel, regulating means associated with each of said machines including a regulating relay having a voltage and a current winding cumulatively arranged and respectively energized in response to the voltage and current of the associated machine, and a third winding arranged differentially with respect to the other two windings, and switching means for connecting said third windings so that each is energized in accordance with the current through its associated machine when said machines are not connected in parallel and so that each is energized in accordance with the current through another machine when said machines are connected in parallel.

4. In combination, a plurality of dynamo electric machines, means for connecting said machines in parallel, regulating means associated with each of said machines including a regulating relay having a voltage and a current winding cumulatively arranged and respectively energized in response to the voltage and current of the associated machine, and a third winding arranged differentially with respect to the other two windings, and switching means for said third windings controlled by said connecting means so that each of said third windings is energized in accordance with the current through its associated machine when said machines are not connected in parallel and so that each is energized in accordance with the current through a different machine when said machines are connected in parallel.

5. In combination, two sources of current, means for connecting said sources in parallel, regulating means associated with each source for varying the terminal voltage thereof as the output of the source varies including a regulating relay having a voltage winding, an overcompounding current winding and an undercompounding current winding, and switching means for selectively controlling said current windings so that the two current windings of each relay are energized in accordance with the current through the associated source when said sources are not connected in parallel and so that the two current windings of each relay are respectively energized in accordance with currents through different sources when said sources are connected in parallel.

6. In combination, two generators, means for connecting said generators in parallel, regulating means associated with each generator for controlling the excitation thereof to vary the terminal voltage of the generator as the current output thereof varies having a voltage winding, an overcompounding current winding and a undercompounding current winding, and switching means for connecting the current windings of each relay so that they are energized in accordance with the current through the associated generator and for connecting the current windings of each relay so that they are respectively energized in accordance with the currents through different generators.

7. In combination, two direct current compound generators having series connected field windings, means for connecting said generators in parallel, regulating means associated with each generator for controlling the excitation thereof including a regulating relay having a voltage winding responsive to the voltage of the associated generator and two differentially arranged current windings, and switching means for connecting the two current windings of each regulating relay in shunt with the series connected field winding of the associated generator when said generators are not connected in parallel and for connecting each current winding which is differentially arranged with respect to the associated voltage winding in shunt with the series connected winding of the other generator when said generators are operating in parallel.

8. In combination, two direct current compound generators having series commutating field windings, means for connecting said generators in parallel, regulating means associated with each generator for controlling the excitation thereof including a regulating relay having a voltage winding responsive to the voltage of the associated generator and two differentially arranged current windings, and switching means for connecting the two current windings of each regulating relay in series in a shunt circuit around the series commutating field winding of the associated generator when said generators are not operating in parallel and for connecting each current winding which is cumulatively arranged with respect to the associated voltage winding and the other current winding of the other relay in series in a shunt circuit around the series commutating field winding of the generator associated with the cumulatively arranged current winding.

In witness whereof, we have hereunto set our hands this twentieth day of December 1928.

HERMAN BANY.
HAROLD T. SEELEY.